United States Patent
Asanuma

Patent Number: 5,920,819
Date of Patent: Jul. 6, 1999

[54] OVERLAY CELL TYPE MOBILE COMMUNICATION SYSTEM

[75] Inventor: Yutaka Asanuma, Tokyo, Japan

[73] Assignee: Kabushiki Kaisha Toshiba, Kanagawa-ken, Japan

[21] Appl. No.: 08/806,196

[22] Filed: Feb. 26, 1997

[30] Foreign Application Priority Data

Mar. 1, 1996 [JP] Japan ............................ 8-044801

[51] Int. Cl.$^6$ ............................ H04Q 7/20; H04B 15/00
[52] U.S. Cl. ............................ 455/447; 455/450; 455/62; 455/63
[58] Field of Search ............................ 455/444, 450, 455/451, 454, 426, 63, 62, 520, 103, 104, 447; 370/330, 321, 478, 436

[56] References Cited

U.S. PATENT DOCUMENTS

| | | | |
|---|---|---|---|
| 5,193,091 | 3/1993 | Crisler et al. ............................ | 455/450 |
| 5,193,101 | 3/1993 | McDonald et al. ............................ | 455/454 |
| 5,203,008 | 4/1993 | Yasuda et al. ............................ | 455/452 |
| 5,212,805 | 5/1993 | Comroe et al. ............................ | 455/520 |
| 5,303,287 | 4/1994 | Laborde ............................ | 455/452 |
| 5,402,523 | 3/1995 | Berg ............................ | 455/450 |
| 5,437,054 | 7/1995 | Rappaport et al. ............................ | 455/451 |
| 5,481,533 | 1/1996 | Honig et al. ............................ | 455/450 |
| 5,483,666 | 1/1996 | Yamada et al. ............................ | 455/454 |
| 5,613,200 | 3/1997 | Hamabe ............................ | 455/62 |
| 5,752,192 | 5/1998 | Hamabe ............................ | 455/452 |
| 5,754,536 | 5/1998 | Schmidt ............................ | 455/451 |

*Primary Examiner*—Reinhard J. Eisenzopf
*Assistant Examiner*—Charles N. Appiah
*Attorney, Agent, or Firm*—Limbach & Limbach L.L.P.

[57] ABSTRACT

When a channel for micro cell is assigned to a mobile station PS1 of a micro cell, one carrier frequency whose reception level is lower than a threshold level is selected from a plurality of up carrier frequencies and down carrier frequencies which a macro cell system holds, an up channel and a down channel for micro cell are set on the selected carrier frequency, the above channels are assigned to the mobile station PS1 of the micro cell to permit radio communication based on the TDD scheme between the mobile station PS1 and a micro cell base station BSb1.

14 Claims, 8 Drawing Sheets

WHEN UP CARRIER FREQUENCY OF MACRO CELL IS USED

FIG. 5

WHEN DOWN CARRIER FREQUENCY OF FDMA MACRO CELL IS SELECTED

FIG. 6

WHEN DOWN CARRIER FREQUENCY OF MACRO CELL IS USED

OVERLAY CELL TYPE MOBILE COMMUNICATION SYSTEM

BACKGROUND OF THE INVENTION

This invention relates to an overlay cell type mobile communication system for performing radio communications by forming and laying a macro cell of a macro cell system and a plurality of micro cells of a micro cell system on each other and permitting the macro cell system and the micro cell system to commonly use part or all of a plurality of carrier frequencies.

In recent years, with an increase in the communication needs and the development of the communication technique, various types of mobile communication systems have been developed. Among them, an overlay cell type mobile communication system is included. The overlay cell type mobile communication system performs radio communications by forming and laying a macro cell with the cell radius of approx. several km, for example, and a plurality of micro cells with the cell radius of approx. several ten meters, for example, on each other on the same service area and causing the cells to use a common carrier frequency. In the above type of system, since the micro cell and the macro cell use the common carrier frequency, the utilization factor of the frequency can be enhanced in comparison with a system using different carrier frequencies.

Figure 10:
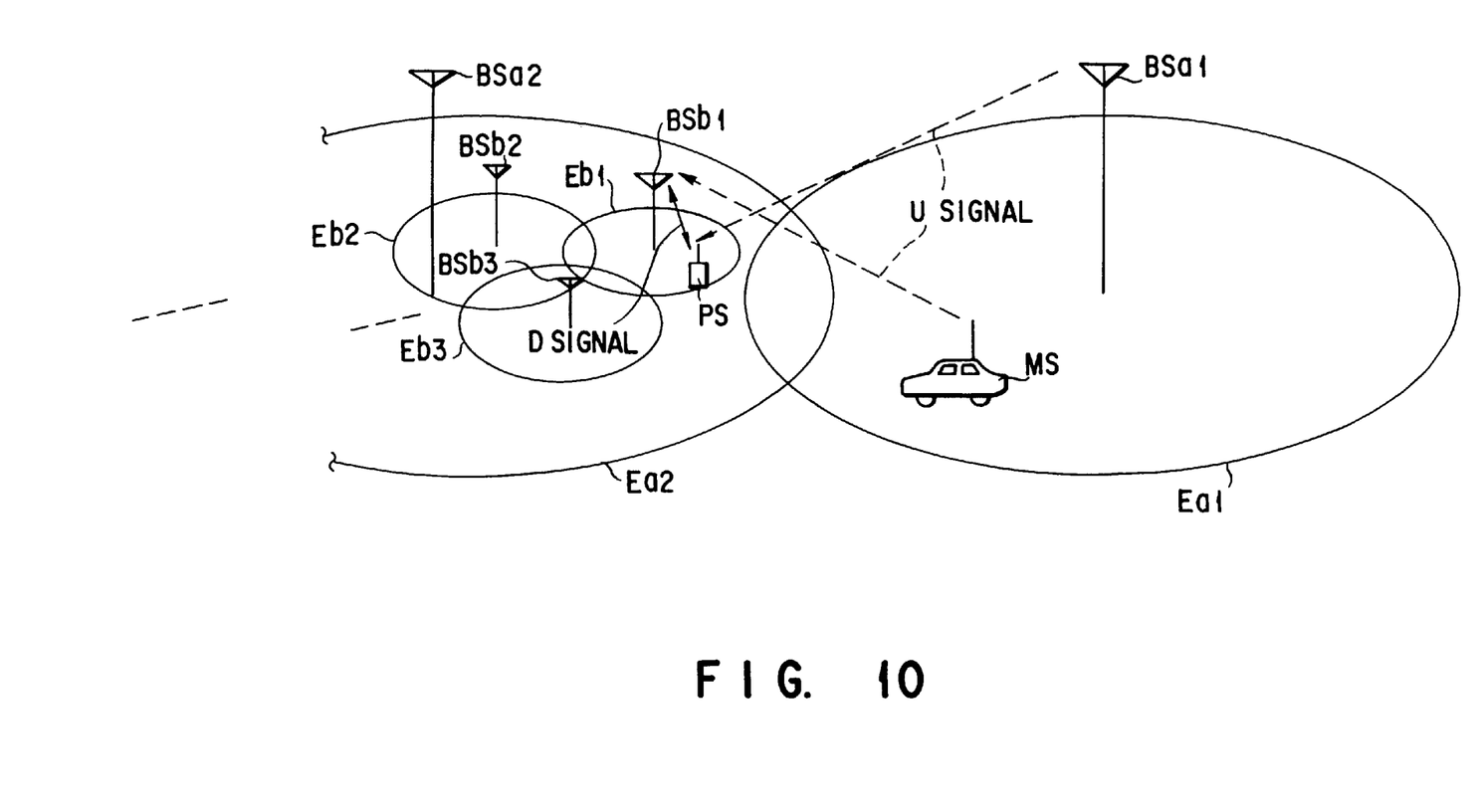
FIG. 10 is a view for illustrating the problem of a conventional overlay cell type mobile communication system.

FIG. 10 is a schematic construction view showing one example of an overlay cell type mobile communication system which is conventionally provided. In FIG. 10, Ea1, Ea2, . . . indicate macro cells and the macro cells Ea1, Ea2, . . . are formed by macro cell base stations BSa1, BSa2, . . . Further, Eb1, Eb2, Eb3, . . . indicate micro cells and the micro cells Eb1, Eb2, Eb3, . . . are formed by micro cell base stations BSb1, BSb2, BSb3, . . . . A mobile station MS of the macro cell system performs radio communications with the macro cell base stations BSa1, BSa2, . . . . A mobile station PS of the micro cell system performs radio communications with the micro cell base stations BSb1, BSb2, BSb3, . . . .

For example, a frequency division multiple access-frequency division duplex (which is hereinafter referred to as FDMA-FDD) scheme is used in the macro cell system and a time division multiple access-frequency division duplex (which is hereinafter referred to as TDMA-FDD) scheme is used in the micro cell system.

Figure 11:
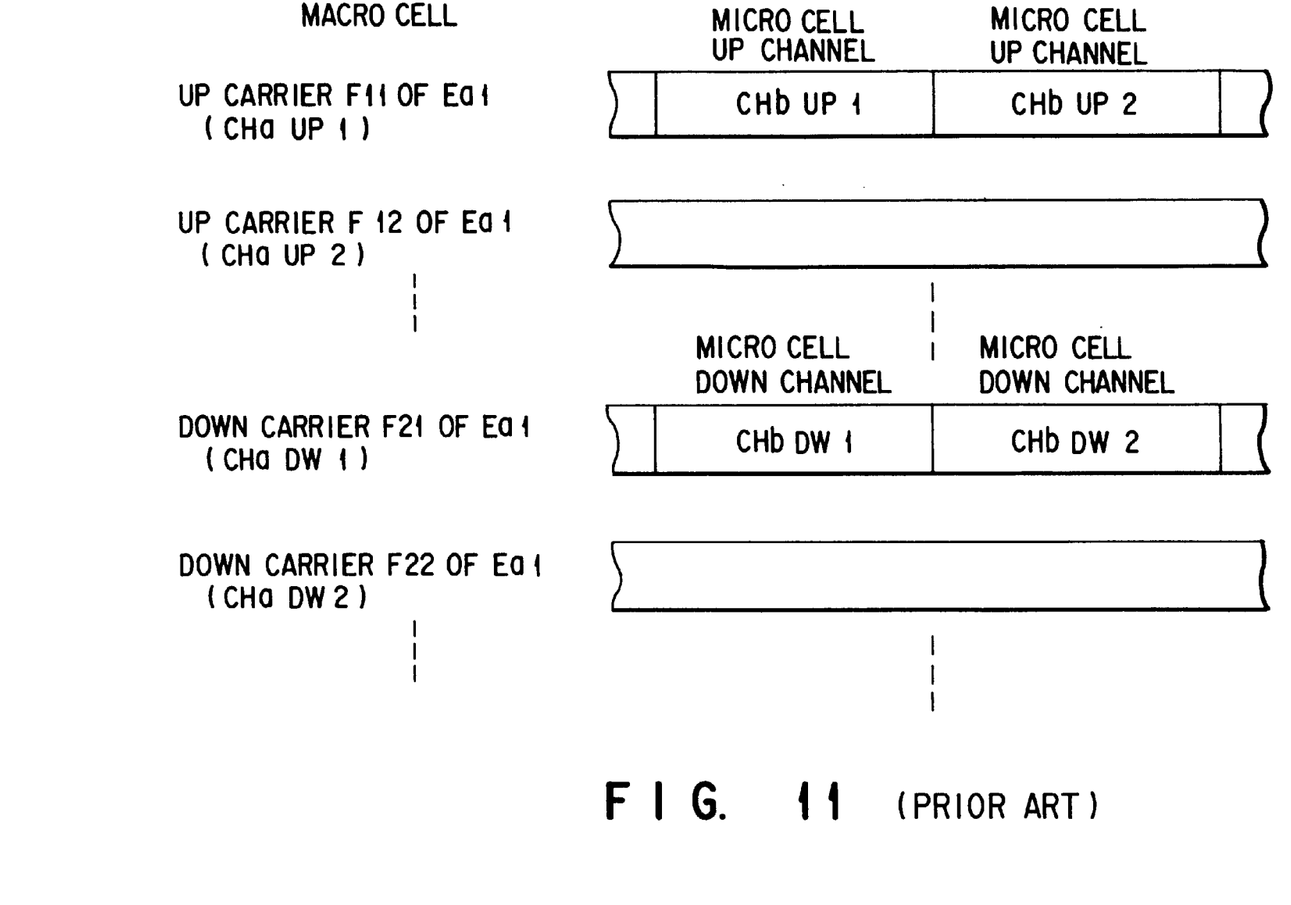
FIG. 11 is a diagram for illustrating the channel assignment in the conventional overlay cell type mobile communication system.

FIG. 11 shows one example of assignment of radio channels in the macro cell system and the micro cell system. Assume now that the mobile station MS of the macro cell system performs radio communication with the macro cell base station BSa1 in the macro cell Ea1 by use of an up channel CHUP1 using a carrier frequency F11 and a down channel CHDW1 using a carrier frequency F21. Further, assume that a call relating to the mobile station PS is issued in this condition in the micro cell Eb1 formed in the adjacent macro cell Ea2. Then, the micro cell base station BSb1 of the micro cell Eb1 searches for carrier frequencies which the micro cell system holds. Based on the result of the searching operation, the micro base station selects a carrier frequency which will not give any influence on the communication of the macro cell system and which satisfies the condition of the ratio (D/U) of a desired wave to an interference wave and then assigns the selected carrier frequency to the mobile station PS.

For example, one pair of up carrier frequency F11 (up channel CHaUP1) and down carrier frequency F21 (down channel CHaDW1) which are used by the macro cell Ea1 and are not used by the macro cell Ea2 are selected. Then, as shown in FIG. 11, an up channel CHbUP1 and a down channel CHbDW1 for micro cell are set on the channels CHaUP1 and CHaDW1 and the channels CHbUP1, CHbDW1 are assigned to the mobile station PS. After this, the mobile station PS starts radio communication with the micro cell base station BSb1 based on the FDD system by use of the pair of up channel CHbUP1 and down channel CHbDW1.

If a call relating to a different micro cell mobile station is issued at the same time, the micro cell base station BSb1 sets an up channel CHbUP2 and a down channel CHbDW2 for micro cell on the carrier frequencies F11, F21 used by the macro cell Ea1 as shown in FIG. 11, for example, and then assigns the thus set channels to the above different mobile station.

That is, in the conventional overlay cell type system, the up channel and down channel of the micro cell are assigned to the up carrier frequency and down carrier frequency for the macro cell so as to perform radio communication based on the FDD system.

However, the system which is conventionally proposed has the following problems. That is, the up carrier frequency and down carrier frequency used for constituting one bi-directional radio channel in the macro cell system are different in the transmission station and radio signal propagation path. For this reason, the degrees of interference given by the radio signals of the up channel and down channel to the micro cell are different from each other in some position of the mobile station MS for macro cell as shown in FIG. 10. Therefore, in the conventional overlay cell type system, if both of the up carrier frequency and down carrier frequency used for constituting one bi-directional radio channel in the macro cell system do not satisfy a preset condition such as the ratio D/U described before, it becomes impossible to select the above carrier frequencies and assign them to the mobile station of the micro cell system.

Therefore, it takes a long time to detect one pair of carrier frequencies which satisfy a preset condition required for the carrier frequencies to be assigned to the mobile station of the micro cell system. The number of pairs of carrier frequencies which can be assigned is small and it is difficult to obtain a sufficiently large number of channels required by the micro cell system.

Further, even when the up and down channels which satisfy the above condition are assigned and the communication quality of one of the carrier frequencies is kept high, it becomes impossible to maintain preferable communication if the interference in the other carrier frequency increases during the communication. As a result, the communication quality tends to be deteriorated during the communication and the probability that one communication process can be smoothly completed, that is, the rate of successful completion of communication becomes low.

BRIEF SUMMARY OF THE INVENTION

An object of this invention is to provide an overlay cell type mobile communication system capable of simplifying the process of setting both of an up channel and a down channel for micro cell in a short time, attaining a sufficiently large number of channels for micro cell, and enhancing the rate of successful completion of communication by suppressing the degradation in the communication quality in a macro cell.

In order to attain the above object, according to a first aspect of this invention, there is provided an overlay cell type mobile communication system which comprises a macro cell system for forming at least one macro cell having a first diameter in a service area and selecting two carrier frequencies from a plurality of carrier frequencies in the macro cell to perform radio communication based on an FDD scheme, and a micro cell system for forming and laying a plurality of micro cells having a second diameter smaller than the first diameter of the macro cell on the macro cell and in which a carrier selecting section for selecting one carrier frequency from the plurality of carrier frequencies which the macro cell system holds and a channel setting section for setting at least one up channel and down channel for micro cell on the selected carrier frequency are provided in the micro cell system so as to permit bi-directional radio communication to be performed by use of the set up channel and down channel.

According to this invention, it is sufficient to select only one carrier frequency which is required for setting one pair of up channel and down channel for micro cell from a plurality of carrier frequencies which the macro cell system holds. Therefore, when both of the up channel and down channel for micro cell are assigned, it is sufficient only if at least one of the up carrier frequency and down carrier frequency of one pair of the macro cell system satisfies the preset condition, for example.

Thus, in comparison with the conventional system in which both of the up carrier frequency and down carrier frequency of one pair of the macro cell system are required to simultaneously satisfy the preset condition, the carrier frequency for assignment can be searched for more easily and in a shorter time. Further, a sufficiently large number of channels for micro cell can be obtained, and as a result, the frequency utilization factor can be further enhanced. This effect is particularly effective in a system utilizing a code division multiple access (CDMA) system in which adjacent cells often use the same carrier frequency.

Even after completion of the channel assignment, it is not necessary to keep both of the reception levels of the interference waves of the up carrier frequency and down carrier frequency for macro cell lower than a preset level and a communication of high quality can be maintained if the reception level of the interference wave of at least one of the up carrier frequency and down carrier frequency used for micro cell is lower than the preset level. Therefore, the rate of successful completion of communication can be enhanced.

Further, in the carrier selecting section, it is preferable to divide a plurality of carrier frequencies which the macro cell system holds into a carrier frequency group for up communication and a carrier frequency group for down communication, select one of the carrier frequency groups, search for a carrier frequency which satisfies a preset condition from the plurality of carrier frequencies included in the selected group, select the other of the carrier frequency groups when the carrier frequency which satisfies the preset condition cannot be detected by the above searching operation, and then search for a carrier frequency which satisfies the above preset condition from a plurality of carrier frequencies included in the selected group.

Generally, a plurality of carrier frequencies which the macro cell system holds are successively arranged for each of the up group and down group in many cases. Therefore, if the carrier frequency searching operation is effected separately for the up group and the down group as described above, the searching operation can be effected smoothly.

Further, in the carrier selecting section, it is preferable to select the down carrier frequency group by use of a first searching section to search for a carrier frequency which satisfies a preset condition and select the up carrier frequency group by use of a second searching section to search for a carrier frequency which satisfies the preset condition. That is, the carrier frequency used for micro cell is selected preferentially from the down carrier frequency group.

If the mobile station of the macro cell system is a mobile station for use in car, the mobile station will move at high speed. Therefore, the radio signal of the up carrier frequency transmitted from the mobile station for car use to the micro cell is subject to the influence of change of communication distance and fading and the reception level tends to fluctuate. On the other hand, the radio signal of the down carrier frequency transmitted from the base station of the macro cell system to the micro cell system is less subject to the influence of change of communication distance and fading. Therefore, if the down carrier frequency is preferentially searched for and a channel for micro cell is set on the carrier frequency, a carrier frequency in which a fluctuation in the condition is less can be selected and a stable communication can be attained even after completion of the channel assignment.

Further, it is preferable to determine a carrier frequency which is first detected to satisfy the preset condition as the carrier frequency for micro cell when the above carrier frequency is detected. In this case, time required for determining the carrier frequency for micro cell can be shortened.

It is also possible to measure the reception levels of all of the carrier frequencies and select one of the carrier frequencies for micro cell based on the result of measurement. In this case, time required for selection becomes longer, but the best carrier frequency can always be selected.

Further, it is also possible to measure the reception level of each of the carrier frequencies for a preset period of time, derive the mean value of the reception level and select the best carrier frequency based on the mean value of the reception level when the carrier frequency for micro cell is selected. In this case, a carrier frequency which is subject to the least influence of interference can be selected.

In the carrier selecting means, it is also possible to select a plurality of carrier frequencies which satisfy the preset condition from a plurality of carrier frequencies which the macro cell system holds, supply the plurality of selected carrier frequencies to the channel setting section for channel setting for micro cell and store the remaining carrier frequencies which are not selected into a memory.

With the above construction, for example, when it becomes impossible to use the selected carrier frequency immediately after selection thereof, the channel setting operation can be instantly effected without effecting the carrier frequency searching operation again by reading out the carrier frequency stored in the memory and using the same.

Further, it is possible to read out the carrier frequency stored in the memory and use the same when a new channel assignment request is received in the micro cell. In this case, since the carrier frequency searching operation can be omitted, the channel setting operation can be effected in an extremely short time.

When the carrier frequency stored in the memory is used, it is preferable to determine whether the carrier frequency holds a preset condition or not and use the carrier frequency if it is determined that the carrier frequency holds the preset condition. In this case, a stable channel setting operation free from interference can be attained.

According to another aspect of this invention, there is provided an overlay cell type mobile communication system comprising a macro cell system for forming at least one macro cell in a service area and selecting two carrier frequencies from a plurality of carrier frequencies in the macro cell to perform radio communication based on a TDMA-FDD scheme and a micro cell system for forming and laying a plurality of micro cells having a diameter smaller than that of the macro cell on the macro cell and in which a carrier selecting section for selecting one carrier frequency from the plurality of carrier frequencies which the macro cell system holds, a time slot selecting section for selecting an available time slot from a plurality of time slots for macro cell communication set on the selected carrier frequency, and a channel setting section for setting at least one up channel and down channel for micro cell on the time slot selected by the time slot selecting section are provided in the micro cell system so as to perform radio communication over the up channel and down channel.

According to this invention, even if the macro cell system utilizes the TDMA-FDD scheme, a radio channel for micro cell can be assigned without giving any interference to the macro cell system and the frequency utilization factor can be further enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
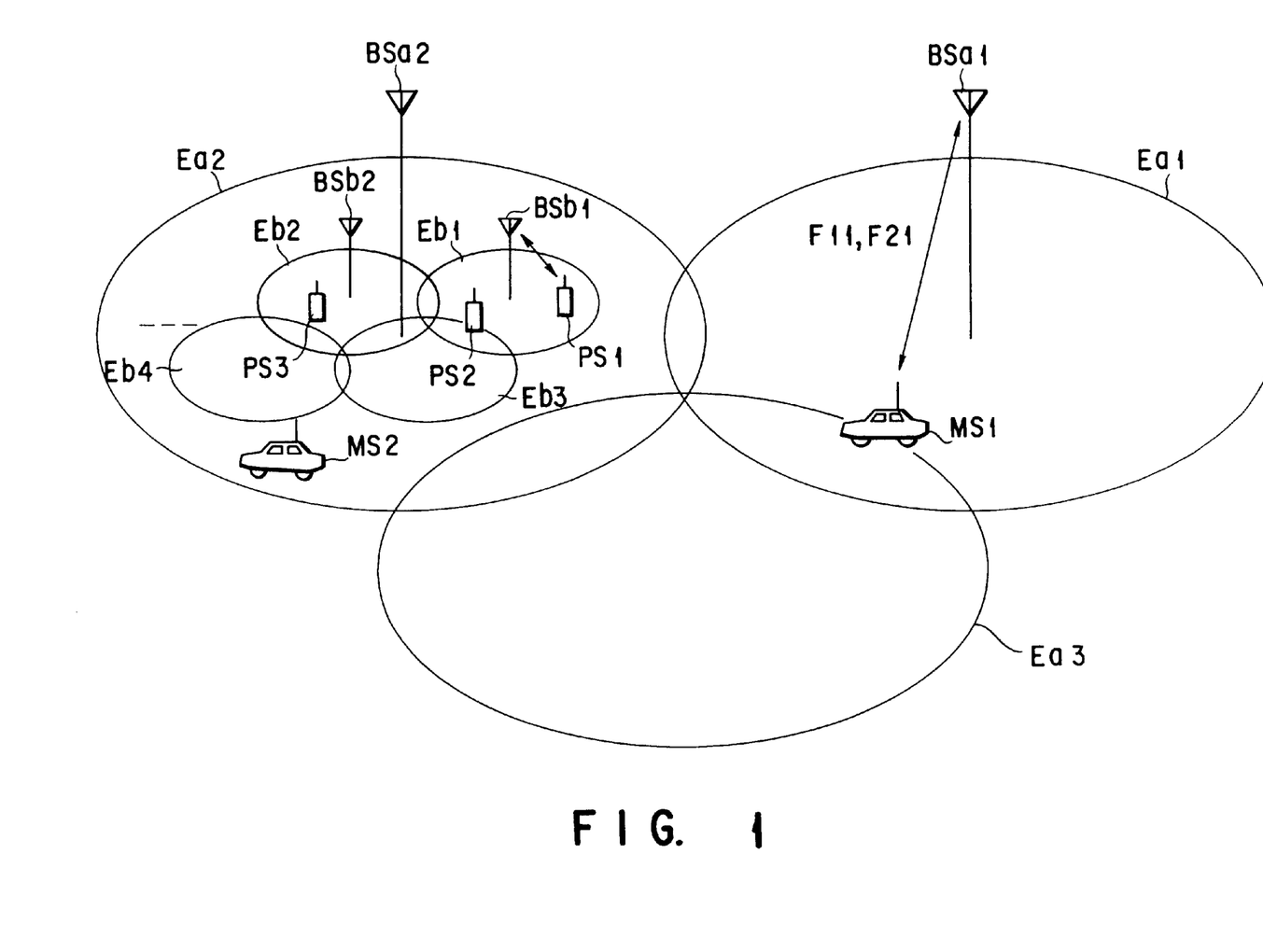
FIG. 1 is a schematic construction view showing one embodiment of an overlay cell type mobile communication system according to this invention.

FIG. 1 is a schematic construction view showing one embodiment of an overlay cell type mobile communication system according to this invention.

The overlay cell type mobile communication system includes a macro cell system and a micro cell system. The macro cell system forms a plurality of macro cells Ea1, Ea2, . . . having a radius of several km, for example, in a service area. Base stations BSa1, BSa2, . . . for macro cell are respectively disposed in the macro cells Ea1, Ea2, . . . . The base stations BSa1, BSa2, . . . are connected to a control station (not shown) via respective wired transmission paths and connected to the public communication line via the control station.

Mobile stations MS1, MS2, . . . registered on the macro cell system are connected to the base stations BSa1, BSa2, . . . of the cells in which the mobile stations now exist via radio channels and further connected to the public communication line via the corresponding base stations BSa1, BSa2, . . . and the control station. The FDMA-FDD scheme is used as the radio access-duplex scheme for radio communication between the mobile stations MS1, MS2, . . . and the base stations BSa1, BSa2, . . . .

The micro cell system forms a plurality of micro cells Eb1, Eb2, . . . having a radius of several ten meters, for example, in the macro cells Ea1, Ea2, . . . . Base stations BSb1, BSb2, . . . for micro cell are respectively disposed in the micro cells Eb1, Eb2, . . . . The base stations BSb1, BSb2, . . . for micro cell are connected to the public communication line (not shown) via the ISDN line or connected to a digital private branch exchange via a private digital network.

Mobile stations PS1, PS2, . . . registered on the micro cell system are connected to the base stations BSb1, BSb2, . . . of the cells in which the mobile stations now exist via radio channels and further connected to the public communication line or digital private branch exchange via the corresponding base stations BSb1, BSb2, . . . . The carrier frequency used for connection between the mobile stations PS1, PS2, . . . and the base stations BSb1, BSb2, . . . is commonly used with the carrier frequency used in the macro cell system. The frequency division multiple access-time division duplex (which is hereinafter referred to as FDMA-TDD) scheme is used as the radio access-duplex scheme.

Figure 2:
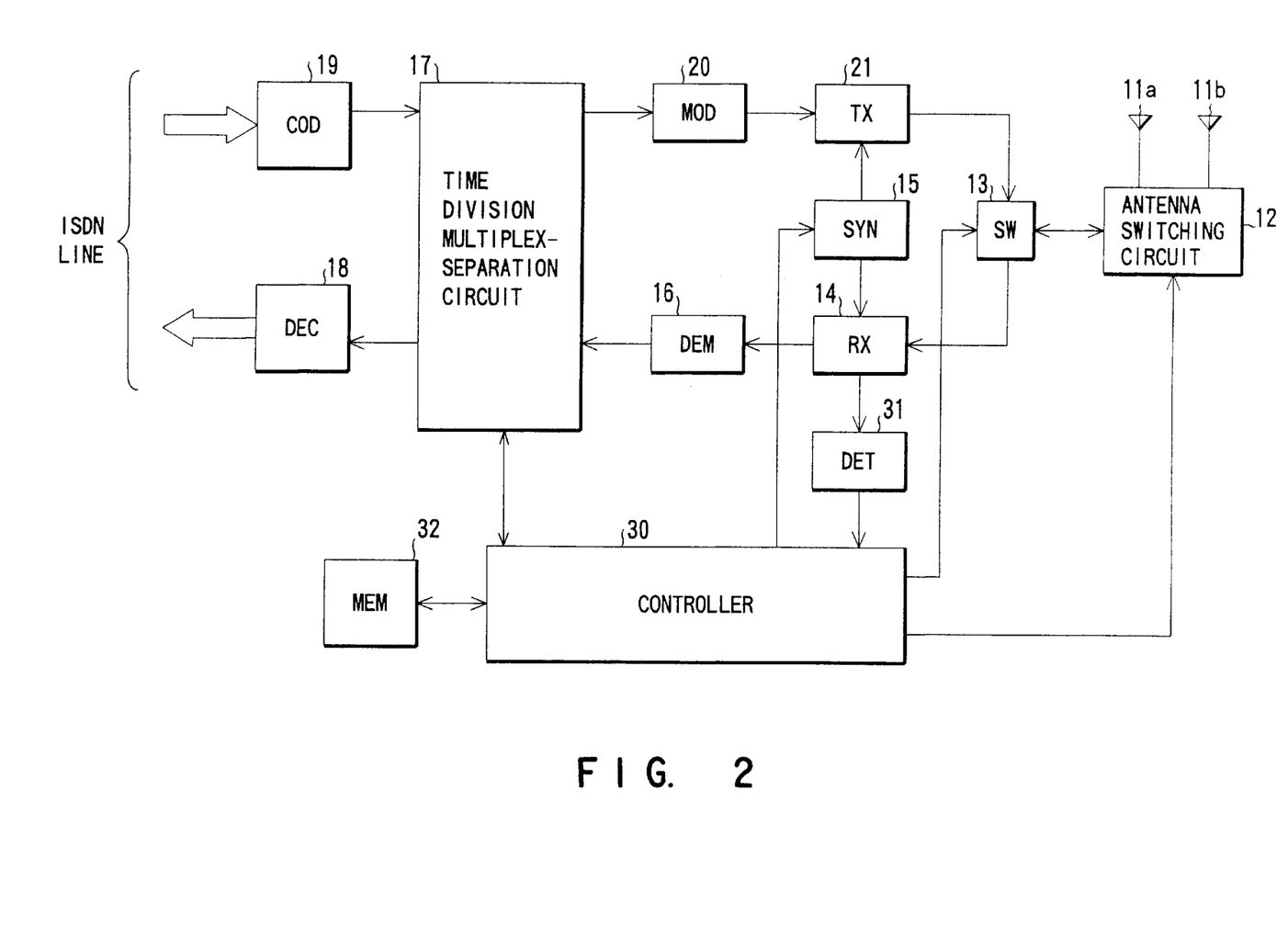
FIG. 2 is a block diagram showing the construction of a micro cell base station used in the system shown in FIG. 1.

FIG. 2 is a block diagram showing one example of the construction of the base stations BSb1, BSb2, . . . of the micro cell system.

Each of the base stations BSb1, BSb2, . . . has two antennas 11a, 11b. The antennas 11a, 11b are separately disposed with a preset distance for space diversity. A radio modulation signal transmitted from each of the mobile stations PS1, PS2, . . . is received by the antennas 11a, 11b and then supplied to a reception circuit (RX) 14 via an antenna switching circuit 12 and a transmission/reception switching circuit (SW) 13. In the reception circuit 14, the radio modulation signal is mixed with a local oscillation signal generated from a frequency synthesizer (SYN) 15 and converted into an intermediate frequency signal. The received intermediate frequency signal is subjected to the digital demodulation in a demodulator (DEM) 16 and is then separated for each slot of constant length in a time division multiplex-separation circuit 17. The thus separated demodulation signal is subjected to the error correction decoding process and speech decoding process in a decoding circuit (DEC) 18 and reproduced speech data is transmitted to the ISDN line.

Speech data supplied from the network via the ISDN line is subjected to the speech coding process and error correction coding process in a coding circuit (COD) 19 and is then input to the time division multiplex-separation circuit 17. In the time division multiplex-separation circuit 17, the speech data is multiplexed for each slot with speech data of another channel. Transmission data output from the time division multiplex-separation circuit 17 is input to a modulator (MOD) 20. The modulator 20 converts the transmission data into a digital modulation signal. In a transmission circuit (TX) 21, the digital modulation signal is mixed with a local oscillation signal generated from the frequency synthesizer 15 and is frequency-converted into a radio modulation signal. At this time, it is amplified to a corresponding transmission power level. The radio modulation signal output from the transmission circuit 21 is supplied to the antennas 11a, 11b via the transmission/reception switching circuit 13 and antenna switching circuit 12 and then transmitted from the antennas 11a, 11b towards the mobile stations PS1, PS2, . . . .

Each of the base stations BSb1, BSb2, . . . includes a controller 30, reception level detecting circuit (DET) 31 and memory 32 as a control system. The reception level detecting circuit 31 measures the reception level of a received radio channel and informs the measurement value to the controller 30.

The controller 30 has a microcomputer as a main control section and has a channel assignment control function for coping with the overlay system in addition to a normal control function for effecting the speech control with respect to the mobile stations PS1, PS2, . . . and the transmission control with respect to the public communication network as the control function thereof.

The channel assignment control function is to effect the control operation for assigning a radio channel for micro cell to a corresponding mobile station when an originating call from the mobile stations PS1, PS2, . . . or a terminating call for the mobile stations PS1, PS2, . . . is issued. The control content is roughly described as follows. That is, the frequency synthesizer 15 is first controlled to permit a plurality of up carrier frequencies and down carrier frequencies used in the macro cell system to be sequentially selected and received. Then, the detected values of the reception levels thereof are fetched from the reception level detecting circuit 31 and carrier frequencies corresponding to the detected values of the reception levels lower than a preset level are selected. After this, the reception levels of the selected carrier frequencies are monitored for a preset period of time and the mean values thereof are derived. Then, carrier frequencies each of which causes the amount of a variation in the reception level to be set within a preset range and causes the mean value of the reception level to be smaller than a threshold value are all selected as available carrier frequencies and one of the selected carrier frequencies corresponding to the smallest one of the mean values of the reception levels is selected. After this, one pair of up channel and down channel for micro cell are set on the finally selected carrier frequency and the thus set pair of up channel and down channel are assigned to a corresponding one of the mobile stations PS1, PS2, . . . .

The memory 32 stores various data and programs necessary for the controller 30 to effect the control operation. In the memory 32, the carrier frequencies other than the finally selected carrier frequency among the plurality of available carrier frequencies selected by the channel assignment control operation are stored as spare carrier frequencies.

Figure 3:
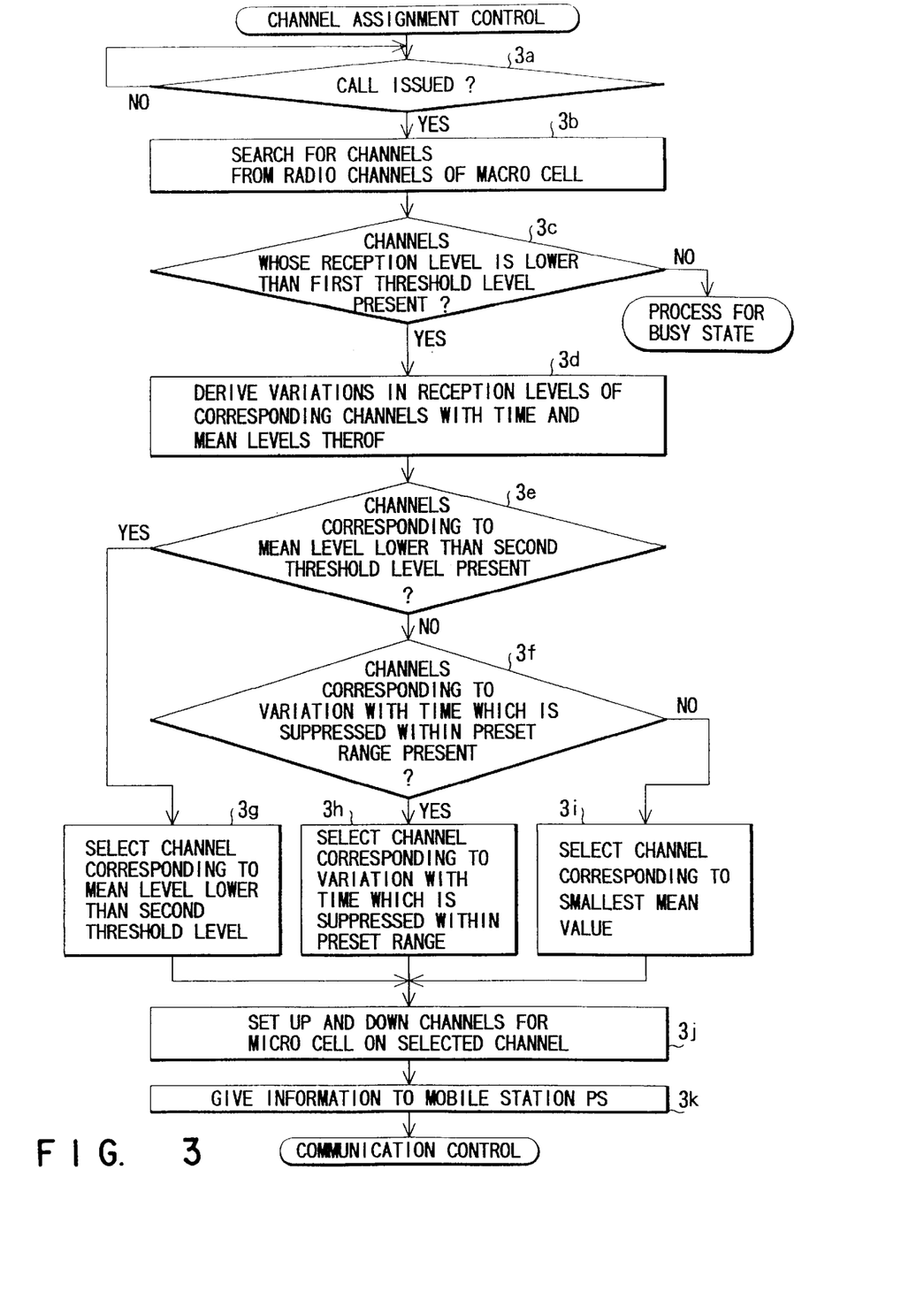
FIG. 3 is a flowchart for illustrating the channel assignment control process in the base station shown in FIG. 2.

Next, the channel assignment control operation in the system with the above construction is explained. FIG. 3 is a flowchart for illustrating the channel assignment control procedure and the control content in the base stations BSb1, BSb2, . . . for micro cell.

Assume now that the mobile station MS1 of the macro cell system performs radio communication based on the FDD scheme with respect to the base station BSa1 for macro cell by use of an up carrier frequency F11 and a down carrier frequency F21 making a pair in the macro cell Ea1 as shown in FIG. 1. Further, assume that the mobile station PS1 for micro cell has issued an originating call request to the micro cell base station BSb1 in the micro cell Eb1 formed in the adjacent macro cell Ea2 in the above condition.

The micro cell base station BSb1 monitors issuance of a call in the step 3a as shown in FIG. 3 in the standby mode. In this state, if an originating call request from the mobile station PS1 for micro cell is received, the step 3b is effected to detect the reception levels of a plurality of up carrier frequencies and down carrier frequencies for macro cell and search for carrier frequencies whose reception levels are lower than a preset first threshold level. That is, the available channel searching operation for all of the carrier frequencies for macro cell is effected. The available channel searching operation is effected by informing the received carrier frequency to the frequency synthesizer 15, causing the reception circuit 14 to receive the radio signal of the carrier frequency, causing the reception level detecting circuit 31 to detect the reception level of the carrier frequency and comparing the detected reception level with the first threshold level in the controller 30.

Then, based on the result of the searching operation, whether carrier frequencies whose reception levels are lower than the first threshold level are present or not is determined in the step 3c, and if the carrier frequency which satisfies the condition is present, the step 3d is effected. If there is no carrier frequency which satisfies the condition, it is determined that the channel assignment is impossible and a process for busy state is effected.

When the step 3d is effected, the micro cell base station BSb1 monitors a variation in the reception level of each of a plurality of carrier frequencies which satisfy the above condition of reception level for a preset period of time. Then, the mean values of the variations in the reception levels for the above preset period of time are derived. Next, whether carrier frequencies corresponding to the mean value which is smaller than a second threshold level are present or not is determined in the step 3e. The second threshold level is set lower than the first threshold level. Therefore, in the step 3e, carrier frequencies which are less subject to interference are selected from the carrier frequencies which are temporarily determined to be available in the previous step 3c.

If carrier frequencies corresponding to the mean values of reception levels lower than the second threshold level are detected as the result of determination in the step 3e, one of the carrier frequencies is selected for channel setting for micro cell in the step 3g. Then, the step 3j is effected to set the up channel and down channel for micro cell on the selected carrier frequency and the result of setting is informed to the mobile station PS1 which is the origin of the originating call request in the step 3k and the communication control is effected after this.

Thus, a radio link of full duplex using the above up channel and down channel is created between the mobile station PS1 for micro cell and the micro cell base station BSb1, and after this, communication based on the TDD scheme can be performed by use of the up and down channels between the mobile station PS1 and the base station BSb1.

If, in the step 3e, it is determined that no carrier frequency which corresponds to the mean value of reception level lower than the second threshold level is detected, the step 3f is effected to determine whether channels corresponding to the amount of a variation in the reception level which is suppressed within a preset range are present or not. That is, carrier frequencies at which a variation in the reception level with time is small or which are less subject to the influence of change of communication distance and fading are detected by the determination in the above step. If carrier frequencies which satisfy the above condition are detected, one of the detected carrier frequencies is selected in the step 3h, then the step 3j is effected to set an up channel and down channel for micro cell on the selected carrier frequency, and the result of setting is informed to the mobile station PS1 which is the source of the originating call request in the step 3k to permit communication based on the TDD scheme with respect to the mobile station PS1.

If a carrier frequency at which a variation in the reception level with time is suppressed within the preset range is not detected, a carrier frequency corresponding to the smallest mean value of the reception level is selected in the step 3i, then the step 3j is effected to set an up channel and down channel for micro cell on the selected carrier frequency for macro cell, and the result of setting is informed to the mobile station PS1 which is the source of the originating call request in the step 3k to permit communication based on the TDD scheme with respect to the mobile station PS1.

As described above, in this embodiment, when a radio channel is assigned to the mobile station PS1 of the micro cell Eb1, the operation of searching for available carrier frequencies of the micro cell is effected, one of the up carrier frequency and down carrier frequency is selected from the carrier frequencies which are determined as frequency carrier frequencies, the up channel and down channel for micro cell are set on the selected carrier frequency and the above channels are assigned to the mobile station PS1 so as to permit radio communication based on the TDD scheme to be performed between the mobile station PS1 and the base station BSb1.

Therefore, in a case where the channels for micro cell are assigned to the mobile station PS1, only one of the up carrier frequency and down carrier frequency of the macro cell system is required to satisfy the preset condition as an available carrier frequency. For this reason, a carrier frequency which can be used for assignment can be easily selected and a sufficiently large number of channels can be acquired in comparison with the conventional system in which both of the up and down carrier frequencies are required to satisfy the preset condition, thereby making it possible to fully achieve the advantage of enhancing the utilization factor of frequencies in the overlay cell type system.

Further, even after the channel assignment, the reception levels of the interference waves in both of the up and down carrier frequencies for macro cell are not required to be kept lower than a preset level and a communication of high quality can be attained only if the reception level of the selected carrier frequency is kept lower than the preset level. Therefore, the rate of successful completion of communication can be enhanced.

In this embodiment, at the time of channel setting for micro cell, whether the reception levels of carrier frequencies of the macro cell are lower than a first threshold level or not is determined to select carrier frequencies which are temporarily determined to be usable. Then, variations in the reception levels of the above carrier frequencies with time and the mean values thereof are detected, whether or not the mean values are smaller than a second threshold level which is lower than the first threshold level is determined, a carrier frequency which will not cause any interference is selected from the carrier frequencies which are temporarily determined to be usable, and an up channel and down channel for micro cell are set on the selected carrier frequency.

Therefore, a carrier frequency having an extremely small possibility of being subject to interference can be selected. For example, it is possible to select a carrier frequency which is not used at all in the adjacent macro cell or an up carrier frequency transmitted from a mobile station which lies in a location of the adjacent macro cell at an extremely far distance from the micro cell.

Figure 4:
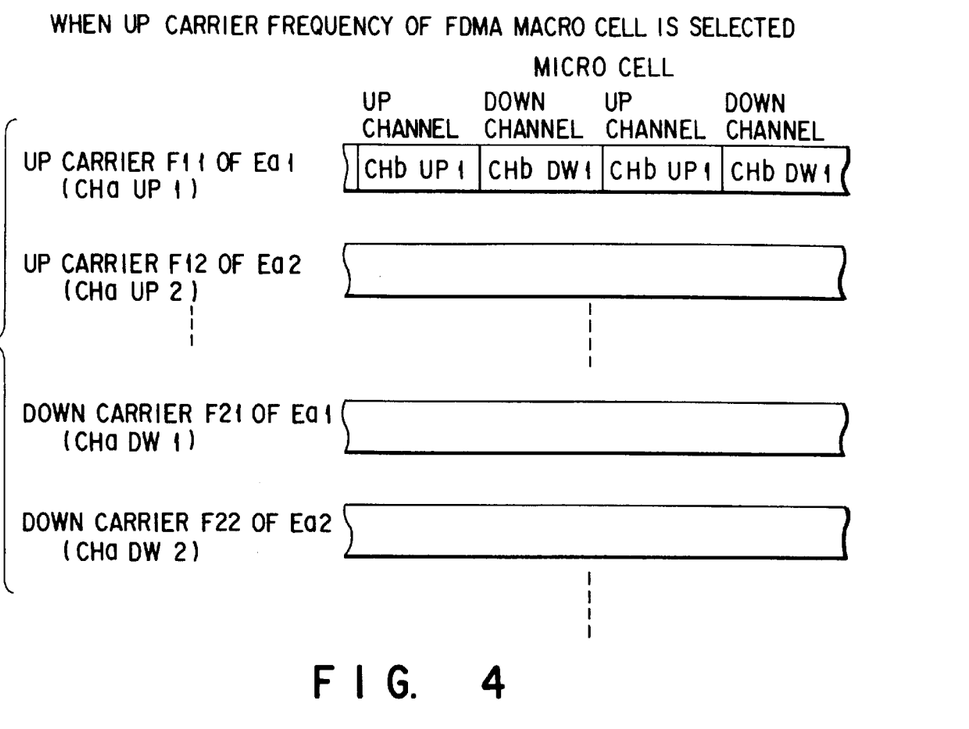
FIG. 4 is a diagram showing an example of the result of channel assignment.

FIG. 4 shows one example of the result of selection of the carrier frequency in the above case, and in this example, an up channel CHbUP1 and down channel CHbDW1 for micro cell are set on the up carrier frequency F11 FDMA up channel (CHaUP1) shown in FIG. 1. In a case where the up channel CHbUP1 and down channel CHbDW1 for micro cell are thus set on the up channel CHaUP1 which is one of a plurality of FDMA up channels CHaUP1, CHaUP2, . . . and a plurality of FDMA down channels CHaDW1, CHaDW2, . . . for macro cell, the following effect can be attained.

Figure 5:
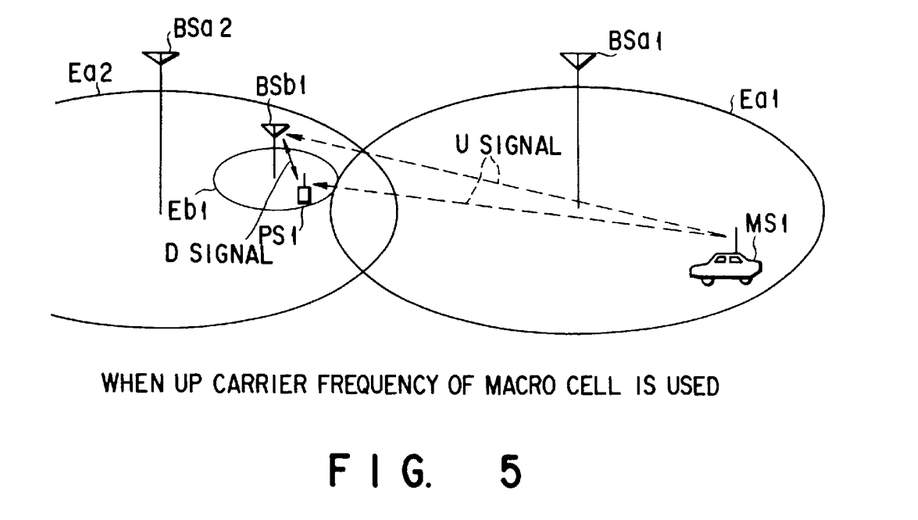
FIG. 5 is a view for illustrating the influence of interference when both of up and down channels for micro cell are assigned to an up channel of the macro cell.

That is, if the mobile station MS1 of the macro cell Ea1 which is now in communication by use of the carrier frequencies F11, F21 lies at a far distance in comparison with the base station BSa1 of the macro cell Ea1 as shown in FIG. 5, for example, the reception level of the radio signal (frequency F11) of FDMA the up channel CHaUP1 transmitted from the mobile station MS1 becomes lower than the reception level of the radio signal (frequency F21) of the FDMA down channel CHaDW1 transmitted from the base station BSa1 to the micro cell Eb1. Therefore, in this case, if the up channel CHbUP1 and down channel CHbDW1 for micro cell are set on the FDMA up channel CHaUP1, a communication of higher quality can be attained in a state in which the mobile station PS1 in the micro cell Eb1 is less subject to interference from the base station BSa1 of the adjacent macro cell Ea1.

Further, in this embodiment, if a channel for macro cell whose reception level is lower than the second threshold level is not detected, whether or not the amounts of variations in the reception levels of the channels are suppressed within the preset range is determined, a channel for macro cell having a less possibility of being subject to the influence of fading is selected, and then the up channel and down channel for micro cell are set on the selected channel for macro cell. Therefore, it becomes possible to prevent selection of an up channel for macro cell transmitted from the mobile station moving at high speed and select a down channel for macro cell transmitted from the base station. That is, it becomes possible to select an adaptive channel by taking the influence of change of communication distance and fading caused by the movement of the macro cell mobile station into consideration.

Figure 6:
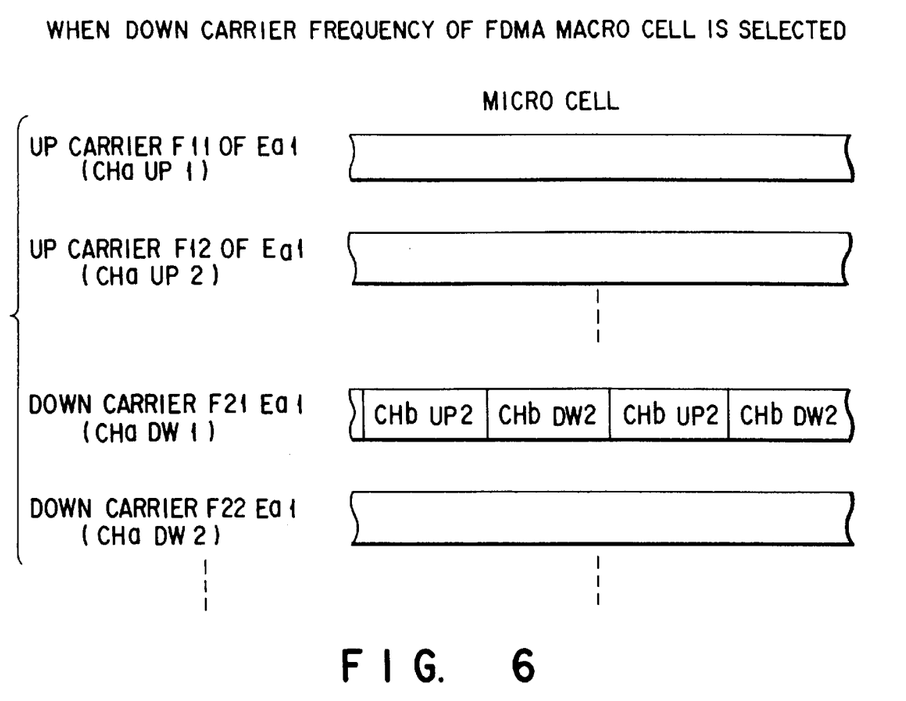
FIG. 6 is a diagram showing another example of the result of channel assignment.

FIG. 6 shows another example of the result of selection of the channel for macro cell and in this example, an up channel CHbUP2 and down channel CHbDW2 for micro cell are set on the FDMA down channel CHaDW1 of frequency F21 which is one of a plurality of FDMA up channels CHaUP1, CHaUP2, . . . and a plurality of FDMA down channels CHaDW1, CHaDW2, . . . for macro cell. In a case where the up channel CHbUP2 and down channel CHbDW2 for micro cell are thus set on the FDMA down channel for macro cell, the following effect can be attained.

Figure 7:
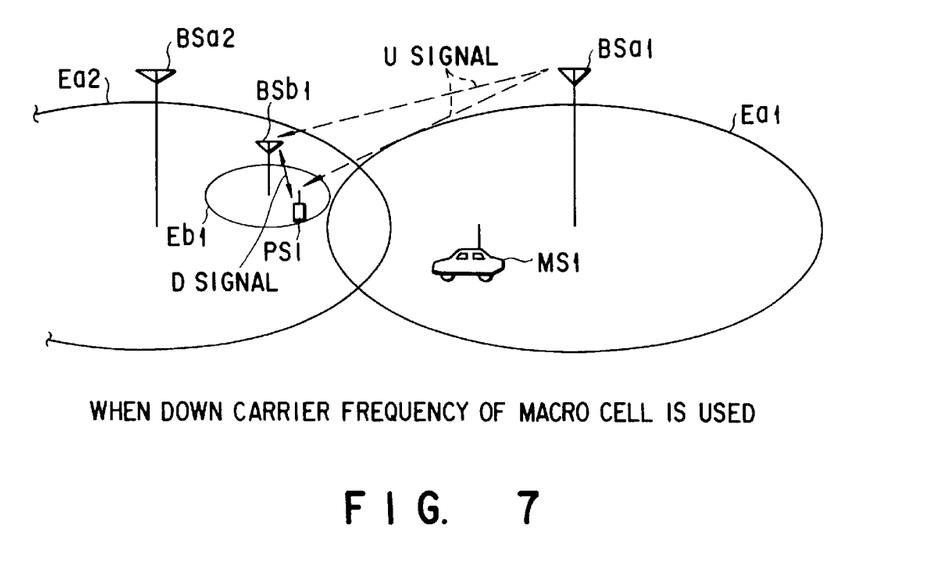
FIG. 7 is a view for illustrating the influence of interference when both of up and down channels for micro cell are assigned to a down channel of the macro cell.

That is, if the mobile station MS1 moves at high speed, the radio signal of the FDMA up channel CHaUP1 for macro cell transmitted from the mobile station MS1 to the micro cell Eb1 is influenced by the change of distance and the fading and the reception level thereof tends to vary. Therefore, if the up channel CHbUP2 and down channel CHbDW2 for micro cell are set on the FDMA down channel CHaDW1 for macro cell, a variation in the level of the radio signal of the down channel CHaDW1 due to fading becomes less since the radio signal is transmitted from the base station BSa1, and as a result, the mobile station PS1 of the micro cell can be expected to perform a communication of high quality without receiving the influence of change of communication distance P' and fading caused by the movement of the macro cell mobile station MS.

This invention is not limited to the above embodiment. For example, in the above embodiment, the FDMA up channel and FDMA down channel for macro cell are adaptively selected based on the reception level and a variation in the reception level with time, but it is possible to fixedly select one of the FDMA up channel and FDMA down channel for macro cell.

Further, it is possible to store a channel which was determined to be usable as the result of searching of FDMA channels for macro cell but was not selected at that time into the memory 32, read out the channel from the memory 32 when a next call is issued, and select and use the channel for channel setting for the micro cell after determining that the channel can be used. In this case, time required for detecting a usable channel can be reduced in comparison with a case wherein the operation of searching for channels for macro cell is started from the beginning each time a call is issued, and as a result, it becomes possible to enhance the operation speed of the channel assigning process and reduce the radio connection time.

When channels for macro cell are selected and assigned to the micro cell mobile station, it is possible to select one of the up carrier channel group and down carrier channel group of the macro cell system according to the previously determined order of priority, search for available channels in the selected group, measure the reception levels thereof, select a channel whose reception level is first detected to be lower than a preset level as the result of the measurement, and set the up channel and down channel for micro cell on the selected channel for macro cell.

For example, up channels are first sequentially searched for to detect channels for macro cell whose reception levels are lower than a preset level, and if usable carrier frequencies are not detected by the searching operation, then down channels are sequentially searched for to detect channels whose reception levels are lower than the preset level. By thus preferentially dealing with the up channels, channels suitable for a case wherein they are apt to be influenced by the base station BSa can be selected.

Alternatively, down channels are first sequentially searched for to detect channels for macro cell whose reception levels are lower than a preset level, and if usable channels are not detected by the searching operation, then up channels are sequentially searched for to detect channels for macro cell whose reception levels are lower than the preset level. By thus preferentially dealing with the down channels for macro cell, channels suitable for a case wherein a large number of mobile stations MS moving at high speed are present can be selected.

Further, in the above sequential searching system, when a channel whose reception level is lower than the preset level is detected, up and down channels for micro cell are set on the channel for macro cell so that the operation of searching for the channel of the micro cell can be effected in a short time in comparison with a case wherein all of the channels are searched for, thereby making it possible to reduce the time for connection of the radio channel.

Further, when channels for micro cell are assigned to the micro cell mobile station, the up and down channels of the macro cell system are randomly searched for and the reception levels thereof are measured, a channel whose reception level is first detected to be lower than the preset level by the measurement is selected and the up and down channels for micro cell are set on the selected channel for macro cell.

In the above embodiment, a case wherein the FDMA scheme is used as the radio access scheme of the macro cell system is explained, but this invention can also be applied to a system using the TDMA scheme or CDMA scheme.

Figure 8:
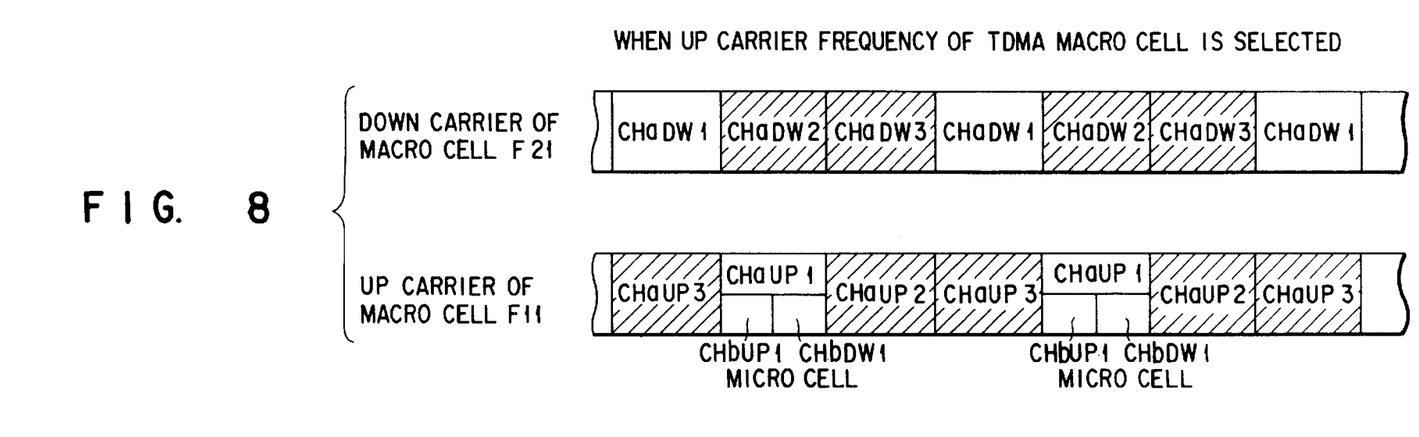
FIG. 8 is a diagram showing an example of the channel assignment in another embodiment of this invention.
Figure 9:
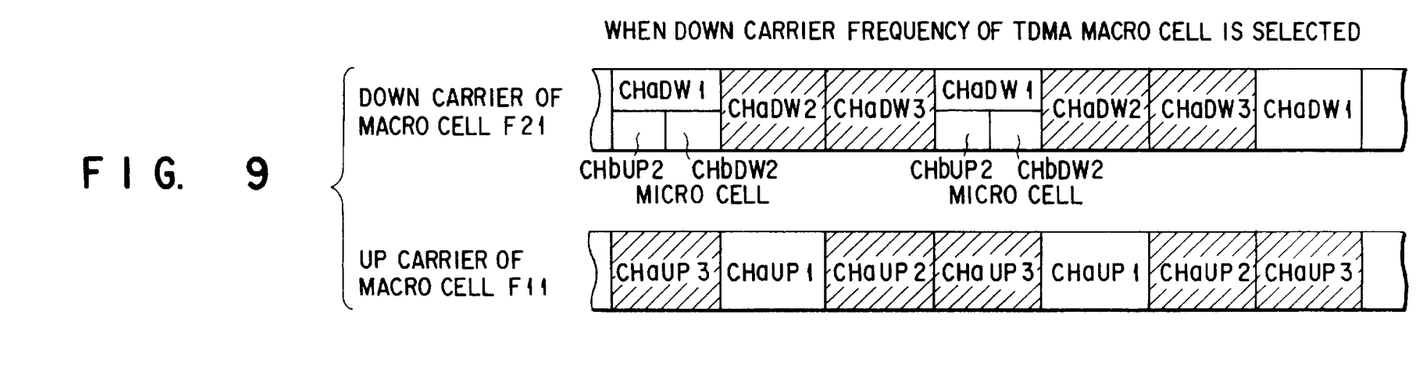
FIG. 9 is a diagram showing an example of the channel assignment in another embodiment of this invention.

FIGS. 8 and 9 show an example of the channel assignment in a case wherein the macro cell system utilizes a 3-channel multiplex TDMA-FDD scheme. Assume now that an available channel searching operation is effected for TDMA up channels CHaUP1 to CHaUP3 and TDMA down channels CHaDW1 to CHaDW3 for macro cell, and as the result of searching operation, the channels CHaUP1, CHaDW1 are detected to be available and the reception level of the up channel CHaUP1 is determined to be lower than that of the down channel CHaDW1. In this case, as shown in FIG. 8, the up channel CHbUP1 and down channel CHbDW1 for micro cell are assigned to the up channel CHaUP1 according to the TDD scheme.

On the other hand, if the channels CHaUP1, CHaDW1 are detected to be available and the reception level of the up channel. CHaDW1 is determined to be lower than that of the down channel CHaUP1 as the result of searching operation, the up channel CHbUP2 and down channel CHbDW2 for micro cell are assigned to the up channel CHaDW1 according to the TDD scheme as shown in FIG. 9.

Further, in the above embodiment, the channel assignment control is effected by the base station of the micro cell system, but the micro cell mobile station may be permitted to independently effect the channel assignment control, and the communication system of the macro cell system, the communication system of the channel for micro cell, the procedure and content of the channel assignment control and others can be variously modified without departing from the technical scope of this invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An overlay cell type mobile communication system comprising:

a macro cell system for forming at least one macro cell having a first diameter in a service area and selecting two carrier frequencies from a plurality of carrier frequencies in the macro cell to perform radio communication based on an FDD scheme; and a micro cell system for forming and laying a plurality of micro cells having a second diameter smaller than the first diameter of the macro cell on the macro cell;

wherein said micro cell system includes:
  carrier selecting means for selecting one carrier frequency from said plurality of carrier frequencies which said macro cell system holds;
  channel setting means for setting at least one up channel and down channel for micro cell on the selected carrier frequency; and
  means for performing bidirectional radio communication by use of the set up channel and down channels; and
  wherein said carrier selecting means includes:
means for dividing said plurality of carrier frequencies which said macro cell system holds into a carrier frequency group for up communication and a carrier frequency group for down communication;
first searching means for selecting one of the carrier frequency groups and searching for a carrier frequency which satisfies a preset condition from a plurality of carrier frequencies included in the selected carrier frequency group; and
second searching means for selecting the other of the carrier freguency groups when a carrier frequency which satisfies the preset condition is not detected by said first searching means and searching for a carrier frequency which satisfies the preset condition from a plurality of carrier frequencies included in the selected carrier frequency group.

2. An overlay cell type mobile communication system according to claim 1, wherein said carrier selecting means sequentially selects each of a plurality of carrier frequencies, measures the reception level thereof, and detects a carrier frequency whose reception level is first determined to be lower than a preset level based on the above measurement.

3. An overlay cell type mobile communication system according to claim 1, wherein said carrier selecting means selects each of a plurality of carrier frequencies at random, measures the reception level thereof, and detects a carrier frequency whose reception level is first determined to be lower than a preset level based on the above measurement.

4. An overlay cell type mobile communication system according to claim 1, wherein said carrier selecting means measures the reception levels of all of the plurality of carrier frequencies, and selects a carrier frequency having a reception level lower than a preset level as the carrier frequency for micro cell from all of the carrier frequencies based on the result of measurement.

5. An overlay cell type mobile communication system according to claim 1, wherein said carrier selecting means selects a desired pair from plural pairs of up carrier frequencies and down carrier frequencies which said macro cell system holds, measures the reception levels of the up carrier frequency and down carrier frequency of the selected pair, and selects one of the up carrier frequency and down carrier frequency whose reception level is lower than a preset level and is lower than the other as the carrier frequency for micro cell.

6. An overlay cell type mobile communication system according to claim 1, wherein said carrier selecting means measures the reception level of each of the carrier frequencies for a preset period of time and selects a carrier frequency having the average value of the reception level which is obtained by the measurement and is lower than a preset level.

7. An overlay cell type mobile communication system according to claim 1, wherein said carrier selecting means selects a plurality of carrier frequencies which satisfy a preset condition from said plurality of carrier frequencies which said macro cell system holds, supplies one of the plurality of selected carrier frequencies to said channel setting means, and stores the remaining carrier frequencies which are not selected into a memory.

8. An overlay cell type mobile communication system according to claim 7, wherein said carrier selecting means determines whether or not the remaining carrier frequency is stored in said memory when a channel setting request is performed and supplies one of the stored carrier frequencies to said channel setting means.

9. An overlay cell type mobile communication system according to claim 8, wherein said carrier selecting means determines whether or not the carrier frequency read out from said memory holds a preset condition and supplies the carrier frequency to said channel setting means.

10. An overlay cell type mobile communication system according to claim 1, wherein said carrier selecting means selects a group of down carrier frequencies by use of said first searching means to search for a carrier frequency which satisfies a preset condition and if the selecting means do not search a carrier frequency which satisfies a preset condition selects a group of up carrier frequencies by use of said second searching means to search for a carrier frequency which satisfies a preset condition.

11. An overlay cell type mobile communication system according to claim 1, wherein said carrier selecting means selects a desired pair of up carrier frequency and down carrier frequency from plural pairs of up carrier frequencies and down carrier frequencies which said macro cell system holds, measures the reception levels of the up carrier frequency and down carrier frequency of the selected pair, determines whether or not the measured value of the reception level is lower than a preset level, and selects the down carrier frequency as the carrier frequency for micro cell when both of the measured value of the reception level of the up carrier frequency and the measured value of the reception level of the down carrier frequency are lower than the preset level.

12. A radio telecommunication apparatus for use in a first radio system, wherein the first radio system encompasses a plurality of first areas each having a first base unit which communicates with the radio telecommunication apparatus, the first areas covered by a second area in a second radio system, the radio telecommunication apparatus comprising:
  selecting means for selecting one of frequencies used in the second radio system;
  setting means for setting a forward and a backward channels in the selected frequency in a time divisional manner; and
  communicating means for communicating with the first base unit over the set forward and backward channels; and
  wherein said selecting means includes means for dividing said plurality of frequencies which said second radio system holds into a frequency group for forward communication and a frequency group for backward communication;
  first searching means for selecting one of the frequency groups and searching for frequency which satisfies a preset condition from a plurality of frequencies included in the selected frequency group; and
  second searching means for selecting the other of the frequency groups when a frequency which satisfies the preset condition is not detected by said first searching means and searching for a frequency which satisfies the preset condition from a plurality of frequencies included in the selected frequency group.

13. A radio telecommunication apparatus according to claim 12, wherein said selecting means selects a group of backward frequencies by use of said first searching means to search for a frequency which satisfies a preset condition and if the selecting means do not search a carrier frequency which satisfies a preset condition selects a group of forward frequencies by use of said second searching means to search for a frequency which satisfies a preset condition.

14. A radio telecommunication apparatus according to claim 12, wherein said selecting means selects a desired pair of forward frequency and backward frequency from plural pairs of forward frequencies and backward frequencies which said second radio system holds, measures the reception levels of the forward frequency and backward frequency of the selected pair, determines whether or not the measured value of the reception level is lower than a preset level, and selects the backward frequency as the frequency for first area when both of the measured value of the reception level of the forward frequency and the measured value of the reception level of the backward frequency are lower than the preset level.

* * * * *